United States Patent [19]

Carl et al.

[11] Patent Number: 4,552,174
[45] Date of Patent: Nov. 12, 1985

[54] SPRING-LOADED CHECK VALVE

[75] Inventors: Louis C. Carl, Horseheads, N.Y.; Charles J. Nevadunsky, Gillett, Pa.

[73] Assignee: ITT Corporation, New York, N.Y.

[21] Appl. No.: 656,120

[22] Filed: Sep. 28, 1984

[51] Int. Cl.[4] .............................................. F16K 15/03
[52] U.S. Cl. ................................. 137/527.2; 251/303; 251/337
[58] Field of Search ............... 137/527, 527.2; 251/75, 251/336, 337, 303

[56] References Cited

U.S. PATENT DOCUMENTS

| 980,188 | 1/1911 | Blauvelt | 137/527 |
| 1,720,444 | 7/1929 | Rowley | 251/303 |
| 4,164,958 | 8/1979 | Jaconette | 137/527 |

FOREIGN PATENT DOCUMENTS

| 7310919 | 2/1975 | Netherlands | 137/527 |
| 291596 | 6/1953 | Switzerland | 137/527.2 |
| 811237 | 4/1959 | United Kingdom | 137/527 |

Primary Examiner—Alan Cohan
Assistant Examiner—John A. Rivell
Attorney, Agent, or Firm—John T. O'Halloran; Peter R. Ruzek

[57] ABSTRACT

A check valve particularly for use in large-volume applications includes a self-contained pressing unit which is mounted on a common pivot with the valve member in the outlet compartment of the valve housing and presses the valve member towards its closing position in which it sealingly contacts the valve seat. The pressing unit includes an elongated support member and an L-shaped pressing member which are mounted on a bearing sleeve for angular displacement relative to one another about the axis of the bearing sleeve. A buckling-type spring is mounted between a free end portion of the support element and the region of merger of the two legs of the L-shaped pressing member, the spring urging the pressing component away from the support component, and against the valve member upon installation on the pivot. The spring characteristic is such that the spring force initially rapidly increases, than drops precipitously and then remains substantially constant over a substantial range of deformation of the spring. The pressing unit is self-contained even when located outside the valve housing and can be introduced into the outlet compartment through an access opening.

13 Claims, 5 Drawing Figures

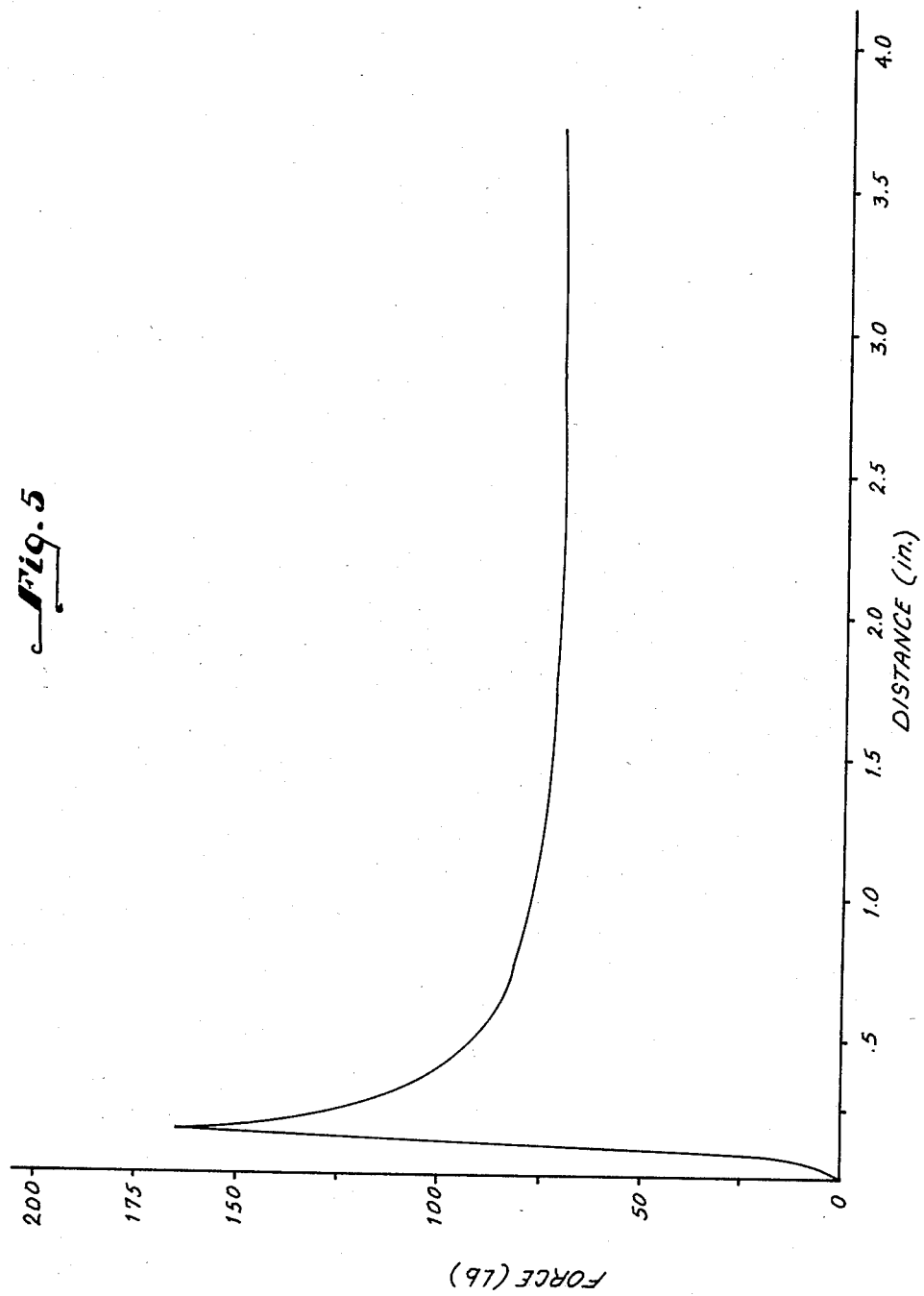

SPRING-LOADED CHECK VALVE

BACKGROUND OF THE INVENTION

The present invention relates generally to spring-loaded check valves, and more particularly to a check valve loaded by a spring having a substantially constant spring force over a considerable range of its deformation.

There are already known various constructions of check valves which are constructed to permit flow of a fluid therethrough in one direction but to prevent such flow in the opposite direction. To keep the valve member in its closing position until and unless the pressure exceeds the outlet pressure by a predetermined margin, it is already known to use springs or weights which act on the valve member and urge the same toward sealing contact with a valve seat provided in the interior of the valve housing. So, for instance, it was already proposed to use a buckling-type helical spring for this purpose, one end of such a spring being connected to the valve member which is pivotaly mounted in the outlet compartment of the valve housing, while the other end of the spring is secured to a region of the valve housing which is spaced at predetermined distance from the valve member. However, experience with this kind of an arrangement has shown that it is quite difficult to assemble the valve of this construction, inasmuch as the spring has to be pretensioned as it is being mounted in the outlet compartment of the valve housing to assure that the valve member will engage the valve seat with a sufficient amount of force to avoid leakage of fluid past the valve member. It is also already known to use spring-loaded 4-bar linkages for urging the valve member against the valve seat; yet, even such constructions have been proven to be less than satisfactory in terms of operation and particularly ease of assembly.

SUMMARY OF THE INVENTION

Accordingly, it is a general object of the present invention to avoid the disadvantages of the prior art.

More particularly, it is an object of the present invention to provide a check valve of the type here under consideration which does not possess the disadvantages of the known check valves of this type.

Still another object of the present invention is so to construct the check valve as to facilitate the assembly thereof, to make it unneccessary to pre-tension the spring while the latter is already received in the outlet compartment, and to minimize the resistance which the valve member offers to the flow of the fluid through the interior of the housing in the one direction when the valve member is in its open position.

A concommitant object of the present invention is so to design the check valve of the above type as to be simple in construction, inexpensive to manufacture, easy to use and reliable in operation nevertheless.

In pursuance of these objects and others which will become apparent hereafter, one feature of the present invention resides in an arrangment for urging a check valve member which is mounted in an outlet compartment of a valve housing for pivoting about an axis of a pivot between a closing position in which its sealingly contacts, and an open position in which it is remote from, a valve seat provided in the valve housing, toward the closing position, this arrangment comprising a support component having a mounting portion, a support portion situated remotely from the mounting portion and in use behind the valve member as considered in the direction toward the open position, and a contact portion; a pressing component having a first portion, a second portion situated remotely from the first portion and in use between the valve member and the support portion of the support component, and a third portion arranged in use to contact a predetermined area of the valve member; a buckling-type helical spring including one end portion secured to the support portion of the support component and another end portion secured to the second portion of the pressing component; and means for mounting the support and second portions on one another for relative angular displacement about an axis for the components to form a self-contained unit with the spring, the mounting and first portions also being mounted in use on the pivot with the axes in substantial coincidence for the spring to urge the contact portion of the support component against the housing and the third portion of the pressing component toward contact with the predetermined area of the valve member. The present invention is also directed to a check valve which incorporates the above-discussed urging arrangement.

A particular advantage of the above-discussed construction is that the self-contained unit including the support and pressing components and the spring can be assembled outside the housing and the spring can be pre-tensioned prior to the introduction of the self-contained unit into the outlet compartment of the housing and temporarily maintained in its pre-tensioned condition until after the unit is mounted on the pivot which simultaneously supports the valve member, whereupon it is merely necessary to discontinue the temporary pre-tensioning action for the spring to apply its pre-tensioning force via the third portion of the pressing component to the valve member to press the latter with the desired force against the valve seat. Another advantage is that no special mounting portions need be provided in the housing for the connection of the spring thereto. Moreover, the components of the self-contained unit can be manufactured very easily and connected to one another in a very simple fashion, thus keeping the cost of manufacture of the valve to a minimum.

BRIEF DESCRIPTION OF THE DRAWING

Above-mentioned and other features and objects of this invention will become more apparent by reference to the following description taken in conjuncton with the accompanying drawings, in which

FIG. 5 is a diagrammatic representation of the dependence of the spring force on spring deformation.

DETAILED DESCRIPTION OF THE PREFERRED EMBODIMENT

Figure 1:
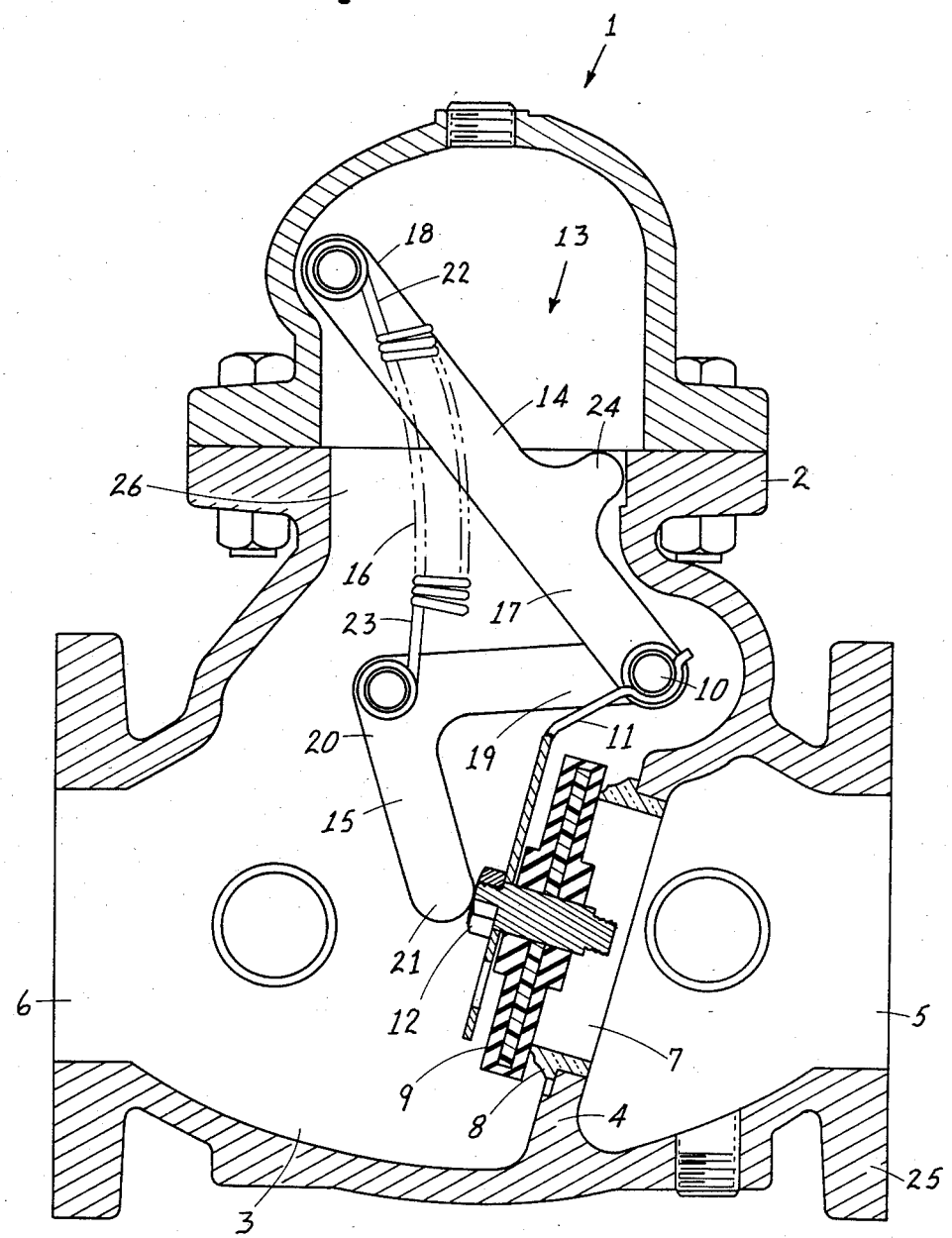
FIG. 1 is a longitudinal sectional view of a check valve according to the present invention in its closing codition.

Referring now to the drawing in detail, and first to FIG. 1 thereof, it may be seen that the reference numeral 1 has been used to identify a check valve constructed in accordance with the present invention, in its entirety. The check valve 1 includes a housing 2 which bounds an internal space 3. The housing 2 includes an internal partitioning wall 4 which subdivides the internal space 3 into an inlet compartment 5 and an outlet compartment 6. The partitioning wall or portion 4 is provided with a passage 7 which establishes communication between the inlet compartment 5 and the outlet compartment 6. A valve seat 8 surrounds the passage 7 at least on the side of the outlet compartment 6.

The flow of fluid between the inlet compartment 5 and the outlet compartment 6 through the passage 7 is controlled by a valve member 9 which is mounted on a pivot 10 supported on the housing 2 for pivoting about an axis of the pivot 10, this pivot axis being substantially parallel to the plane of the valve seat 8 and being off-set said along such plane from the passage 7. The mounting of the valve member 9 on the pivot 10 is accomplished by a hinge 11, to which the valve member 9 is connected by means of a fastener 12 shown to be constructed as a bolt.

In FIG. 1, the valve member 9 is shown in its closing position in which it sealingly contacts the valve seat 8 and hence prevents flow of fluid between the compartments 5 and 6, so long as the pressure prevailing in the inlet compartment 5 does not considerably exceed the pressure prevailing in the outlet compartment 6.

Figure 2:
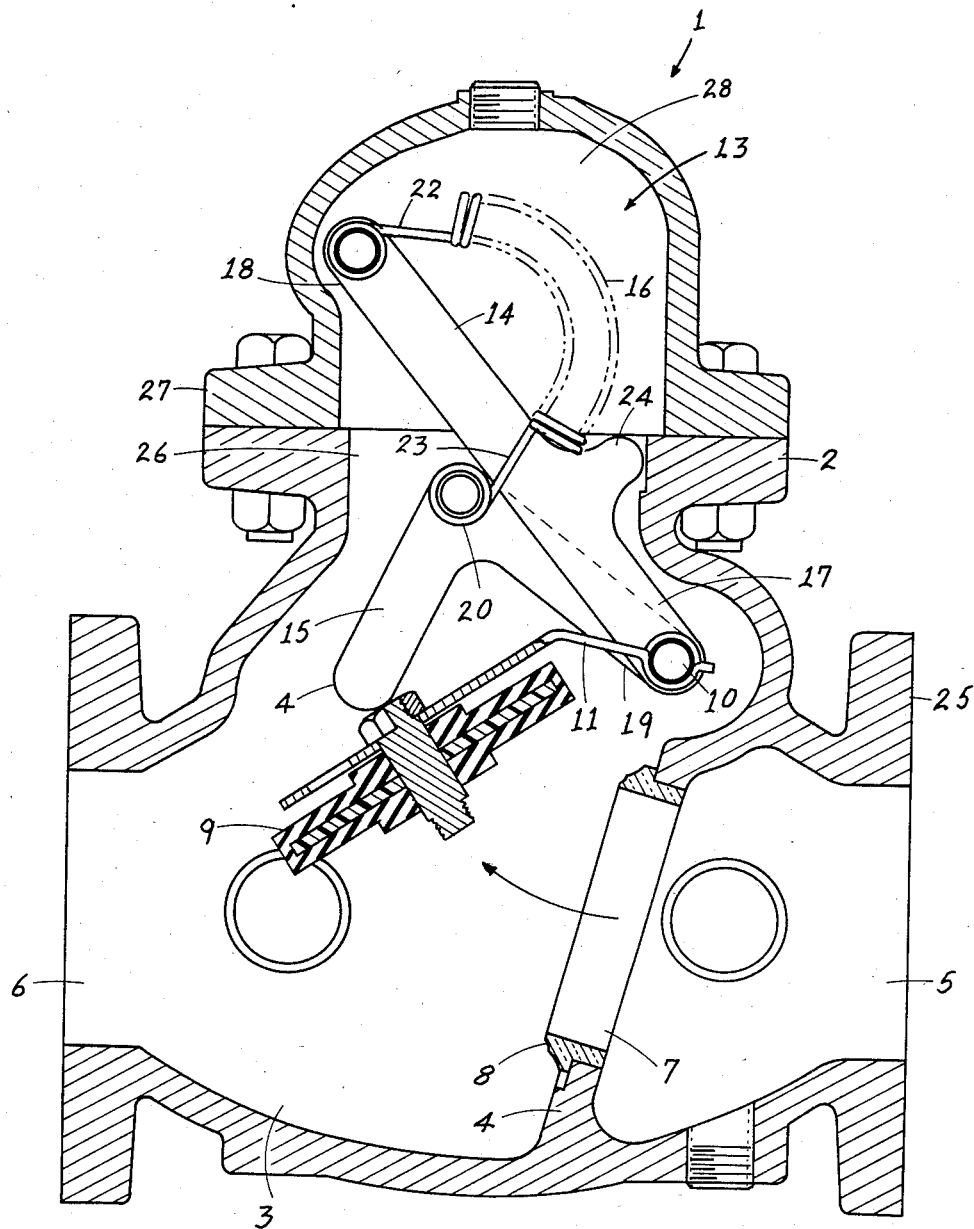
FIG. 2 is a view similar to FIG. 1, but with the check valve in its open position.

The valve member 9 is held in its closing position of FIG. 1 by a spring-loaded pressing mechanism or unit designated in its entirety by the reference numeral 13. The pressing unit 13 includes two main components 14 and 15 and a spring 16. The component 14, which will hereinafter be referred to as the support component, is elongated, that is, it extends along a substantially straight course between its mounting portion 17 and its support portion 18. The mounting portion 17 is mounted, in a manner yet to be described, on the pivot 10. The component 15 extends along a substantially L-shaped course, that is, it has a shape which resembles that of a bell crank lever. This component 15, which will be called a pressing component, includes a first portion 19 which is mounted for pivoting about the axis of the pivot 10, a second portion 20 at which the two arms of the L-shaped pressing component 15 come together, and a third portion 21 which engages the valve member assembly 9, 11 and 12 and particularly the bolt 12 thereof. The spring 16 has two end portions 22 and 23 which are respectively secured to the support portion 18 of the support component 14, and to the second portion 20 of the pressing component 15. The spring 16 is of a known construction such as that manufactured by Ameteck-Hunter Spring of Hatfield, Pa. under the trade name Flexator. In the spring 16 of this construction, the end portions 22 and 23 are both situated at the same side of the spring 16 which is of a helical configuration between the end portions 22 and 23. Because of this construction, when compression forces are applied to the spring 16, the eccentric arrangement of the end portions 22 and 23, in conjunction with a slight degree of buckling imparted to the spring 16 during the assembly of the unit 13 and retained in the position of FIG. 1, will cause the spring 16 to increase the degree of its buckling, as will become apparent from the comparison of FIG. 2 with FIG. 1. In addition to facilitating the further buckling, the relatively small degree of buckling evident from FIG. 1 has another purpose, namely, that of urging the portions 18 and 20 apart. More particularly, the longitudinal axis of the spring 16 extends along a substantially straight course in the relaxed condition of the spring 16, so that the spring 16 must be prestressed for it to extend along the arcuate course illustrated in FIG. 1. As will be explained in more detail later, this initial pre-stressing or pre-tensioning causes the pressing element 15 to urge the valve member 9 against the valve seat 8 with a predetermined force to maintain the valve member 9 in sealing contact with the valve seat 8 so long as the pressure in the inlet compartment 5 is the same as in the outlet compartment 6 or exceeds the pressure in the outlet compartment 6 by less than a predetermined amount.

To maintain the support element 14 in position, that is, to prevent displacement or yielding of the support element 14 under the influence of the force of the spring 15 thereon, the support element 14 is provided with a transversely extending contact portion 24 which is pushed by the force of the spring 16 into abutment with the housing 2, once the unit 13 is introduced into the housing 2. Of course, the force of the spring 16 also prevents the support element 14 from moving in the opposite direction. Hence, once the unit 13 is installed in the housing 2, the support element 14 remains stationary while the spring 16 presses the pressing component 15 against the valve member assembly 9, 11 and 12. On the other hand, when the pressure in the inlet compartment 5 exceeds the pressure in the outlet compartment 6 by a predetermined amount, the resistance force of the spring 16 to deformation is overcome, and the valve member 9 is caused to move away from the valve seat 8, with attendant displacement of the pressing component 15 towards its open position illustrated in FIG. 2. Of course, the extent of displacement of the valve member 9 will depend on the force of the fluid acting on the valve member 9 and on the resistance force exerted by the spring 16.

The housing 2 includes a main portion 25 which bounds the inlet and outlet compartments 5 and 6 and also an access opening 26 which communicates with the outlet compartment 6 or forms a part thereof, and an auxiliary portion 27 of a substantially dome-shaped configuration which is connected to the main portion 25, spans the opening 26 and bounds an internal cavity 28. The support component 14 extends into the cavity 28, and so does the spring 16. The dimensions of the unit 13 are such that the unit 13 can be introduced into the outlet compartment 6 through the access opening 26, and/or removed from the outlet compartment 6 through such opening 26.

Figure 3:
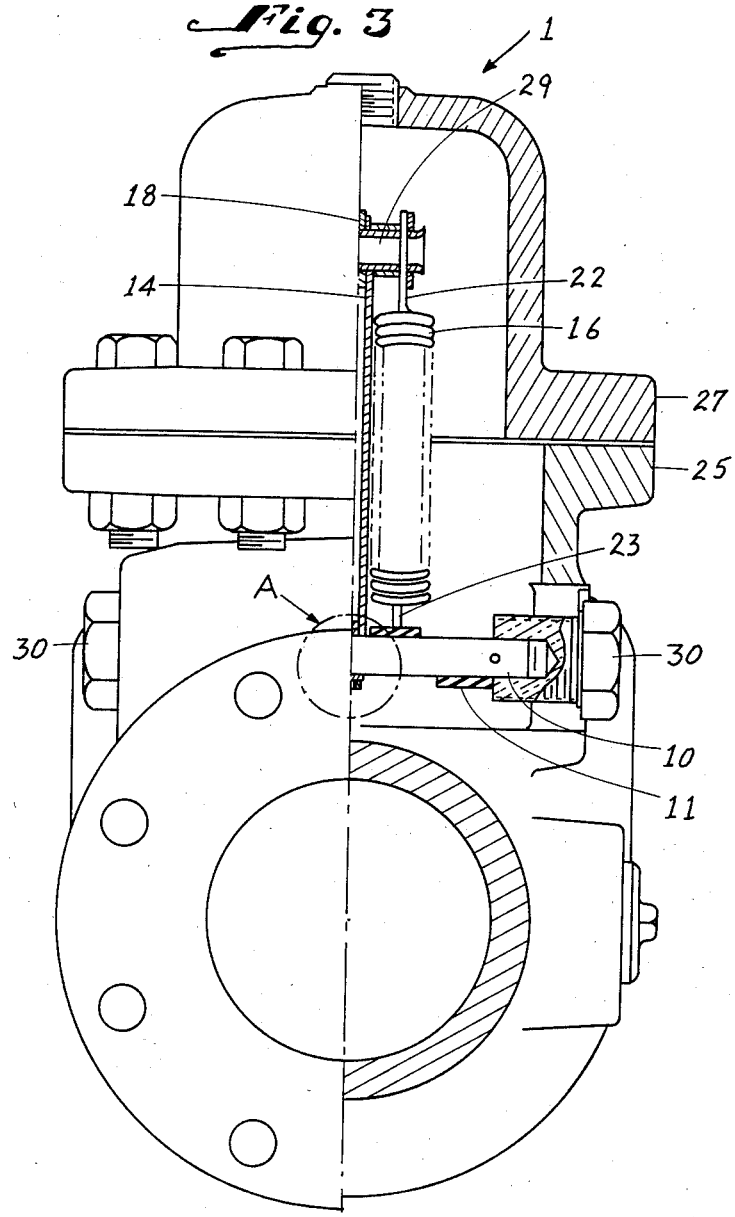
FIG. 3 is a partially cross-sectioned end view of the valve invention and the closed position of FIG. 1.

FIG. 3 shows that the end 22 of the spring 16 is connected to the support portion 18 of the support component 14 by being mounted on a pin-shaped or sleeve-shaped element 29 which is secured to the support portion 18. The end 23 of the spring 16 is connected to the second portion 20 of the pressing component 15 in a similar or identical manner, but this has been omitted from the drawing for the sake of clarity. FIG. 3 of the drawing also shows that the pivot 10 is mounted on the main portion 25 of the housing by means of plug-shaped end bearing elements 30 which are threadingly received in appropriate threaded bores of the housing 2 and which have respective recesses that receive the end portions of the pivot 10. It is also shown there how the hinge 11, which is of a conventional construction, is mounted on the pivot 10 and that the support component 14 is arranged at the central region of the valve 1. Another spring 23 is preferably arranged at the opposite side of the unit 13 substantially symmetrically to the illustrated sping 23.

Figure 4:
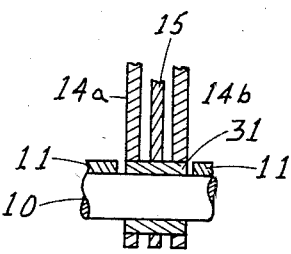
FIG. 4 is an enlarged sectional view of area A of FIG. 3.

FIG. 4 shows that the support component 14 includes two separate support elements 14a and 14b of substantially identical configuration which are spaced from one another in the axial direction of the pivot 10, while the pressing component 16 is disposed between the elements 14a and 14b. The elements 14a and 14b and the component 15, rather than being mounted directly on the pivot 10, are mounted on an intermediate sleeve 31 which accommodates a portion of the pivot 10. The intermediate sleeve or bearing 31 is advantageously so dimensioned as to be received with interference fit in corresponding holes of the elements 14a and 14b, while the pressing component 15 is mounted on the bearing 31 for pivoting about this axis of the latter which, in the assembled condition, coincides with the axis of the pivot 10. Because of the above-mentioned interference fits of the bearing 31 in the holes of the elements 14a and 14b, the unit 13 is joined at this area even in the absence of the pivot 10, that is, even when the unit 13 is located outside the housing 2, so that the unit 13 is self-contained.

Finally, FIG. 5 shows the spring characteristic of the spring 16, that is, the dependence of the resistance force exerted by the spring 16 on the deformation of the spring 16. It may be seen that the spring force increases rapidly with increasing deformation or distance, this being the area of pretensioning of the spring 16. The spring force drops precipitously afterward (this corresponds to the initial opening of the valve), whereupon the spring force remains substantially constant over considerable distance. This means that, once the valve member 9 is displaced to a relatively small extent away from the valve seat 8, the further displacement of the valve member 9 towards its fully open position of FIG. 2 in which it is situated substantially out of the way of the main flow of the fluid through the valve 1 takes relatively little effort.

Such a valve can find advantageous use in waterworks and in fire protection service. A check valve of this type usually requires special characteristics. It is necessary that it remain closed to the passage of fluid in the normal direction of flow until the pressure at the inlet is, for example 1 to 3 psi above the outlet pressure. When the inlet pressure exceeds the opening pressure threshold (which is also referred to as "cracking" or "breaking" pressure) the valve expected to open fully and to present little impediment to fluid flow. A check valve of this type is also expected to present an effective barrier to the flow of fluid in the reverse direction.

Very often, such detector check valves are installed in fire protection lines. Under such circumstances, it is not desirable to meter the water flowing through the fire protection lines, since ordinarily there would be no water usage in such lines. The reason for this is that large water meters are very expensive and also impede the flow of water in the event of a fire. On the other hand, water purveyors wish to know if water is being pilfered for non-fire protection purposes. In this installation, the detector check valve has a very small meter installed in a line bypassing the seat of the valve. When the inlet pressure exceeds the outlet pressure by a measurable amount, small amounts of water pass through the meter and thus flow is detected. If the pressure drop is significant, the valve is opened and presents little or no obstruction to the flow necessary for fighting fires. It may be seen from the above description that the check valve 1 constructed according to the present invention is ideal for these purposes or applications since it satisfies all of the criteria expected to be satisfied by the check valve. Furthermore, this valve may also be advantageously used in applications where it is desired to deal with the water hammer effect.

While we have described above the principles of our invention in connection with specific apparatus, it is to be clearly understood that this description is made only by way of example and not as a limitation to the scope of our invention as set forth in the objects thereof and in the accompanying claims.

We claim:
1. A check valve comprising
   a housing bounding an internal space and including a partitioning portion that subdivides said internal space into an inlet compartment and an outlet compartment and has a communicating passage therein and a valve seat thereon which extends around said passage and along a valve seat plane;
   a supporting pivot mounted in said outlet compartment and having a pivot axis extending parallel to said plane and offset along said plane from said passage;
   a valve member mounted on said pivot for pivoting about said pivot axis between a closing position in which it sealingly contacts said valve seat, and an open position in which it is remote from the latter;
   a support component having a mounting portion mounted on said pivot, a support portion situated remotely from said pivot behind said valve member as considered in the direction toward said open position, and a contact portion;
   a pressing component having a first portion mounted on said pivot for pivoting about said pivot axis, a second portion situated remotely from said pivot between said valve member and said support portion of said support component, and a third portion arranged to contact a predetermined area of said valve member; and
   a buckling-type helical spring including one end portion secured to said support portion of said support component and another end portion secured to said second portion of said pressing component for said spring to urge said contact portion of said support component against said housing and said third portion of said pressing component toward contact with said predetermined area of said valve member.

2. The check valve as defined in claim 1, wherein said housing includes a main portion having an access opening that opens into said outlet compartment, and an auxiliary portion detachably connected to said main portion in a position in which it extends across said access opening and sealingly separates the latter from the exterior of said housing.

3. The check valve as defined in claim 2, wherein said access opening is dimensioned to permit passage of at least said valve member, said support and pressing components, and said spring therethrough between the exterior of said main portion of said housing and said outlet compartment.

4. The check valve as defined in claim 3, wherein said support and pressing components and said spring are joined together to form a self-contained unit even when situated outside said housing; wherein said access opening is dimensioned to permit the passage of said self-contained unit therethrough; and wherein said pivot mounts said valve member and said self-contained unit in said outlet compartment after introduction thereof into the latter through said access opening.

5. The check valve as defined in claim 2, wherein said auxialiary portion bounds a cavity which opens into said access opening in said position and wherein said support portion of said support component extends into said cavity.

6. The check valve as defined in claim 1, wherein said support component extends along a substantially straight course from said mounting portion to said support portion thereof; and wherein said contact portion extends transversely of said course intermediate said mounting and support portions.

7. The check valve as defined in claim 1, wherein said pressing component extends along a substantially L-shaped course between said first and said third portions thereof, said second portion being situated at the region of merger of the two legs of the L-shaped course.

8. The check valve as defined in claim 1, wherein the spring is of the type in which the resistance force thereof to deformation initially rapidly increases, then rapidly drops to a predetermined level, and then remains substantially at the predetermined level, with increasing deformation.

9. An arrangement for urging a check valve member mounted in an outlet compartment of a valve housing for pivoting about an axis of a pivot between a closing position in which it sealingly contacts, and an open position in which it is remote from, a valve seal provided in the valve housing, toward said closing position, said arrangement comprising a support component having a mounting portion, a support portion situated remotely from said mounting portion and in use behind said valve member as considered in the direction toward said open position, and a contact portion;

a pressing component having a first portion, a second portion situated remotely from said first portion and in use between said valve member and said support portion of said support component, and a third portion arranged in use to contact a predetermined area of said valve member;

a buckling-type helical spring including one end portion secured to said support portion of said support component and another end portion secured to said second portion of said pressing component; and means for mounting said support and second portions on one another for relative angular displacement about an axis for said components to form a self-contained unit with said spring, said mounting and first portions also being mounted in use on said pivot with said axes in substantial coincidence for said spring to urge said contact portion of said support component against said housing and said third portion of said pressing component toward contact with said predetermined area of said valve member.

10. The arrangement as defined in claim 9, wherein said support component extends along a substantially straight course from said mounting portion to said support portion thereof; and wherein said contact portion extends transversely of said course intermediate said mounting and support portions.

11. The arrangement as defined in claim 9, wherein said pressing component extends along a substantially L-shaped course between said first and said third portions thereof, said second portion being situated at the region of merger of the two legs of the L-shaped course.

12. The arrangement as defined in claim 9, wherein the spring is of the type in which the resistance force thereof to deformation initially rapidly increases, then rapidly drops to a predetermined level, and then remains substantially at the predetermined level, with increasing deformation.

13. The arrangement as defined in claim 9 wherein said mounting means includes a mounting sleeve passing through said member and first positions and having an internal bore for receiving a portion of said pivot to mount said unit on the latter.

* * * * *